United States Patent [19]
Miyauchi

[11] 3,771,764
[45] Nov. 13, 1973

[54] METHOD OF PRODUCING THE SEAT RING OF A BUTTERFLY VALVE AND THE SEAT RING THEREOF

[75] Inventor: Akio Miyauchi, Akashi, Japan

[73] Assignee: Naigai Rubber Industry Co., Ltd., Akashi-shi, Hyogo-ken, Japan

[22] Filed: Feb. 25, 1972

[21] Appl. No.: 229,391

[30] Foreign Application Priority Data
Feb. 27, 1971 Japan................................ 46/9856

[52] U.S. Cl..................... 251/306, 249/95, 249/96, 249/107, 249/144, 249/145, 425/DIG. 47, 425/242
[51] Int. Cl............................................ F16k 1/226
[58] Field of Search................. 249/83, 95, 96, 107, 249/144, 145; 251/305–308; 264/262; 425/DIG. 47, 242

[56] References Cited
UNITED STATES PATENTS
| | | | |
|---|---|---|---|
| 3,241,806 | 3/1966 | Snell | 251/306 X |
| 3,418,411 | 12/1968 | Fawkes | 264/262 |
| 3,667,726 | 6/1972 | Church et al. | 251/306 X |

*Primary Examiner*—Henry T. Klinksiek
*Attorney*—James E. Armstrong et al.

[57] ABSTRACT

This invention relates to a method of producing the seat ring of a butterfly valve which has the steps of inserting concentrically a preformed inner layer of wear resisting and anticorrosive material and an outer layer of thermosetting resin or thermoplastic resin having high softening temperature into the cavities of preheated metal molds through a predetermined space to hermally expand the outer layer by the preheat of the metal mold to closely contact the outer layer with the inner surfaces of the cavities of the metal molds, then injecting molten resilient material between the inner and outer layers simultaneously through a plurality of injecting holes opened at intervals from the exterior of the outer layer around the outer layer, then cooling to solidify the resilient material to form an intermediate layer for integrating the inner and outer layers to provide three layers. This invention relates also to the seat ring produced by the method of this invention.

6 Claims, 12 Drawing Figures

METHOD OF PRODUCING THE SEAT RING OF A BUTTERFLY VALVE AND THE SEAT RING THEREOF

BACKGROUND OF THE INVENTION

This invention relates to a method of producing the seat ring of a butterfly valve for essentially treating corrosive liquid and the seat ring thereof.

In general, a butterfly valve is so constructed as to have a valve body formed by cast iron, a seat ring contained and fixed in the interior of the valve body, a stem passed through the seat ring from the upper and lower portions of the valve body, and a disc fixed at the end of the stem in the seat ring and to rotate the stem by a handle thereby rotating the disc around the stem as a center so as to flow and shut off the liquid in the seat ring. As the seat plate rotates, the inner peripheral portion of the seat ring is slidably contacted with the peripheral portion of the seat plate so as to be necessary to seal the liquid simultaneously to have the strength endurable for the liquid pressure, superior wear resisting and anticorrosive properties for chemical fluid. Further, in order to allow the solid disc to be rotated, the inner peripheral surface of the seat ring, i.e. the inner layer is desirably supported by resilient body. However, as described above, the seat ring which has an inner layer made of synthetic resin superior in wear resisting and anticorrosive properties and a layer made of resilient materials for supporting the inner layer, has less strength of the seat ring itself, and, therefore, as the disc rotates, the resilient layer is deformed so as to remarkably lose the liquid sealing nature or to become difficult to endure high pressure. Accordingly, there is recently used a seat ring which has three layers such as an inner layer, a resilient layer, which will hereinafter be called an intermediate layer, and an annular outer layer molded by hard synthetic resin around the outer peripheral portion of the seat ring formed with the inner layer and the resilient layer as a strong member so as to reinforce the valve body itself at the same time to finish the dimensions of the outer diameter of the seat ring in high accuracy. However, since the seat ring made of three layers is heretofore made by a method of integrating the intermediate layer made of resilient material by adhering the preformed inner and outer layers with the intermediate layer, the process for producing the seat ring is complicated so as to require much trouble to become expensive at the same time the size of the obtained products is not uniform, and it is very difficult to obtain the uniform and highly accurate seat rings. In order to eliminate such disadvantages, it is desirable to conduct an injection molding the three layers of inner, outer and intermediate layers simultaneously so as to intend the simultaneous integration of the inner, outer and intermediate layers, but in the conventional injection molding technique, there sometimes takes place a trouble such that the foreign material contained in the inner, outer and intermediate layers and resilient material injected between the inner and outer layers flow out locally between the inner and outer layers upon injection molding thereof with the result that the intermediate layer made of resilient material tends to be locally formed between the inner and outer layers so that the circularity of the inner layer with respect to the outer layer is remarkably lost. Particularly in the seat ring such as in the butterfly valve so formed as to rotate the disc thereof, if the circularity of the seat ring is lost, it is apprehended not to be used at all as a seat ring. For this reason, it has been heretofore desired to eliminate such disadvantages in the integral formation of the seat ring by the injection molding.

SUMMARY OF THE INVENTION

It is, therefore, an object of the present invention to provide a method of producing the seat ring of a butterfly valve which eliminates the aforementioned disadvantages of the conventional process and has the steps of inserting preformed inner and outer layers into preheated metal molds to thermally expand the outer layer so as to tightly contact it with the inner surface of the cavities of the metal molds, the injecting molten resilient material between the inner and outer layers to integrate the inner and outer layers simultaneously to form an intermediate layer for resiliently supporting the inner layer in order to prevent the injected resilient material from leaking between the inner and outer layers and the inner surface of the cavities of the metal molds for the intermediate layer to be formed locally.

It is another object of the present invention to provide a method of producing the seat ring of a butterfly valve which has the step of simultaneously injecting resilient material between the inner and outer layers through a plurality of injecting holes opened at intervals from the exterior of the outer layer so as to uniform the pressure distribution in the cavities of the metal molds and to obtain an intermediate layer of uniform material.

It is a further object of the present invention to provide a method of producing the seat ring of a butterfly valve which has the step of providing an inner layer superior in wear resisting and anticorrosive properties and an outer layer of hard material as a strong member to an intermediate layer for supporting the inner layer resiliently, which outer layer determines an accurate position when the seat ring is filled into a valve body so as to enhance the accuracy of the seat ring itself.

It is still another object of the present invention to provide a method of producing the seat ring of a butterfly valve which has the step of integrating the preformed inner and outer layers with an intermediate layer formed by an injection molding so as to make the connection of the three layers rigid to prevent the separation of the three layers from each other and to improve its endurability simultaneously providing rigid seat ring against the pressure and deformation.

It is still another object of the present invention to provide a method of producing the seat ring of a butterfly valve which has the step of integrating the inner and outer layers with the intermediate layer formed by an injection molding so as to increase the productivity to reduce its cost.

It is still another object of this invention to provide the seat ring of a butterfly valve produced by the method of this invention.

According to one aspect of the present invention, there is provided a method of producing the seat ring of a butterfly vlave which comprises the steps of inserting concentrically an inner layer formed in cylindrical shape with the resin superior in wear resisting and anticorrosive properties and an annular outer layer formed with thermosetting resin or thermoplastic resin having high thermal deformation temperature as a strong member into preheated metal molds through a proper space to thermally expand the outer layer by utilizing the preheat of the metal molds to closely contact the outer layer with the inner surfaces of the cavities of the metal molds, the injecting molten resilient material between the inner and outer layers simultaneously through a plurality of injecting holes opened at intervals on the periphery of the outer layer from the exterior of the outer layer, and then cooling to solidify the injected resilient material to form an intermediate layer for integrating the inner and outer layers to provide three layers.

BRIEF DESCRIPTION OF THE DRAWINGS

A more complete appreciation of the present invention will be readily obtained as the same becomes better understood by reference to the following detailed description when taken in conjunction with the accompanying drawings, wherein.

DETAILED DESCRIPTION OF THE PREFERRED EMBODIMENTS

Figure 1:
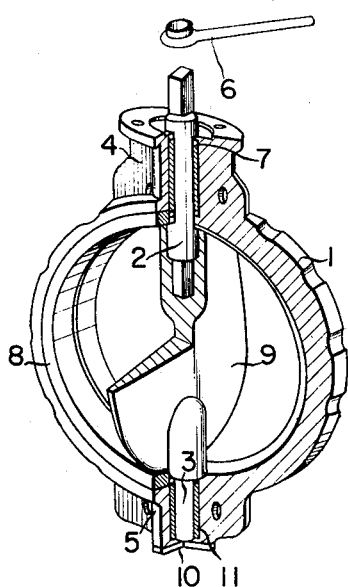
FIG. 1 is a perspective view of the general butterfly valve partly cutout.

Reference is now made to the drawings, wherein like reference unmerals designate identical, or corresponding parts throughout the several views, and more particularly to FIG. 1, which shows the general butterfly valve partly cutout, the butterfly valve has an annular valve body 1 having fitting ports 4 and 5 bored at the top and lower portions thereof, top and bottom stems 2 and 3 inserted into the fitting ports 4 and 5, respectively. The one top stem 2 is disposed on the top of the valve body 1 and is longer than that of the other bottom stem 3. The butterfly valve also has a handle 6 mounted to the projected portion of the top stem 2 from the fitting port 4. The barrel of the top stem 2 is axially sealed tightly in the fitting port 4 by a sealing such as an O-ring 7 provided in the fitting port 14 of the valve body 1, and the lower end of the top stem 2 is projected through a seat ring 8 tightly engaged with the inner peripheral surface of the valve body 1 into the interior of the valve body 1. The lower end of the top stem 2 projected into the valve body 1 is fixed to the periphery of a disc 9 rotatably provided in the seat ring 8 so as to rotate the disc 9 in the seat ring 8 together with the rotation of the top stem 2. On the other hand, the other bottom stem 3 is disposed at the lower portion of the valve body 1, and the lower end of the bottom stem 3 is contacted with a bottom cover 10, and the barrel of the bottom stem 3 is axially sealed tightly in the fitting port 5 by a sealing such as an O-ring 11 is provided in the fitting port 5 of the valve body 1, and the upper end of the bottom stem 3 is projected through the seat ring 8 into the valve body 1, and the lower peripheral portion of the disc 9 is fixed to the end of the bottom stem 3. When the seat ring 8 engaged within the valve body 1 is produced, the material of the inner layer is selected depending upon the liquid treated by the valve, the material of the outer layer is so selected as to have the strength sufficiently endurable for the using pressure against the inner and intermediate layers, and the material of the intermediate layer is selected from the resilient material for tightly sealing the inner layer with the disc between the inner and outer layers to provide a good liquid tightness.

Figure 2A:
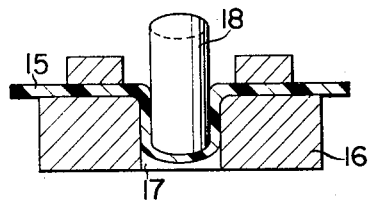
FIG. 2(a) to 2(f) are views of the molding steps of the inner layer of the seat ring according to the present invention.
Figure 2B:
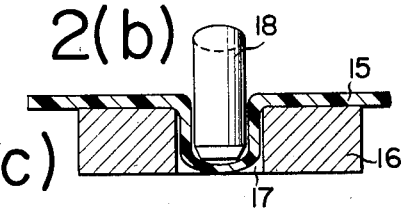
Figure 2C:
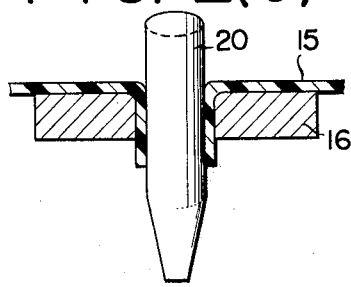
Figure 2D:
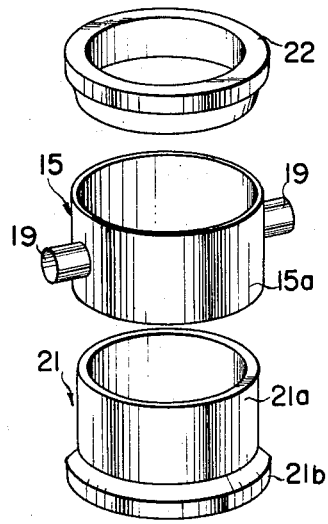
Figure 2E:
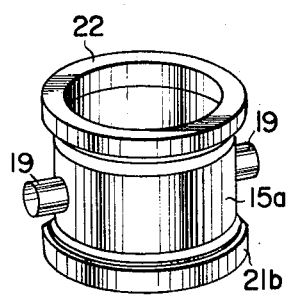
Figure 2F:
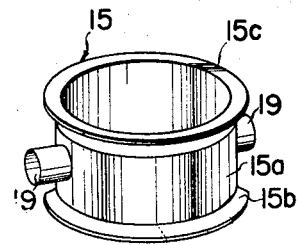

Referring now to FIGS. 2(a) to 2(f), which show the molding steps of the inner layer of the seat ring according to the present invention, in order to perform the method of producing the seat ring of a butterfly valve of the present invention, the inner layer 15 of the seat ring 8 is formed to a cylinder 15a from material superior in wear resisting and anticorrosive properties such as, for example, fluorine resin as shown in FIG. 2(d), a metal mold 16 heated to approximately 150° to 200°C is then disposed on the opposite surfaces with each other of the peripheral surface of the cylinder 15a, a heated bar jig 18 is urged under pressure toward through holes 17 of the metal mold 16 disposed at the outside of the cylinder 15a fromthe inner surface of the cylinder 15a so as to gradually extrude the peripheral surface of the cylinder 15a to form stem-inserting holes 19 and 19 of the stems 2 and 3, respectively at part of the peripheral surface of the cylinder 15a along the through hole 17 of the metal mold 16. As shown in FIG. 2(c), an expanding jig 20 having a sharp end is further urged under pressure into the stem-inserting holes 19 and 19 so as to open the stem-inserting holes 19 and 19 at the same time the cylinder 15a is engaged with the outer peripheral surface of the metal mold heated to 120° to 180° C in oder to form a collar edge 15b at the openings of both ends of the cylinder 15a. A metal mold 21 has a collar edge 21b at one end of the cylindrical barrel 21a thereof, and the collar edge 15b is formed at one end of the cylinder 15a by the collar edge 21 b of the metal mold 21, the collar edge 15c similar in shape to the collar edge 15b is formed at the other end of the cylinder 15a by a metal mold 22 having a collar edge urged to the other end of the metal mold 21 under pressure so as to form the inner layer 15 having collar edges 15b and 15c generally perpendicular to the cylinder at the opening ends of both ends of the cylinder 15a with two stem-inserting holes 19 and 19 at the peripheral surfaces opposite to each other of the cylinder 15a as shown in FIG. 2(f).

Figure 3:
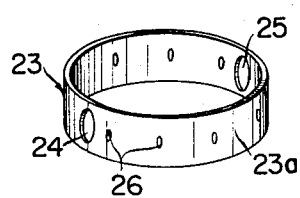
FIG. 3 is a perspective view of the outer layer of the seat ring.
Figure 4:
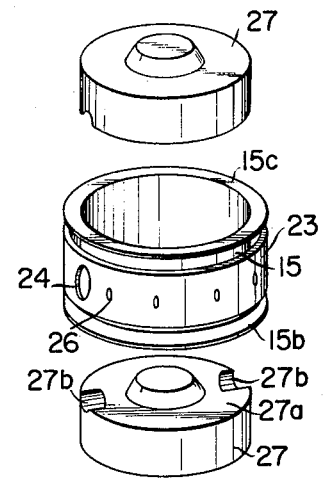
FIG. 4 is an exploded perspective view of the step of engaging a fixing core between the inner and outer layers of the seat ring.
Figure 5:
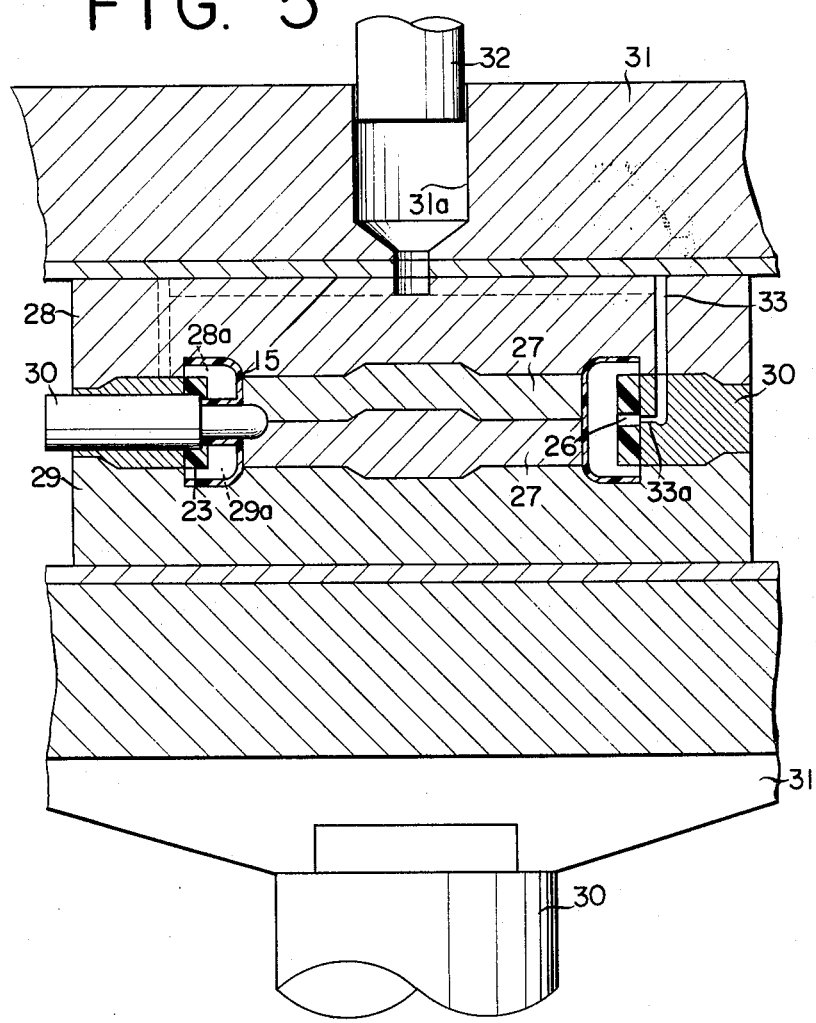
FIG. 5 is a longitudinal sectional view of the state that the inner and outer layers and fixing core are inserted into the metal mold.
Figure 6:
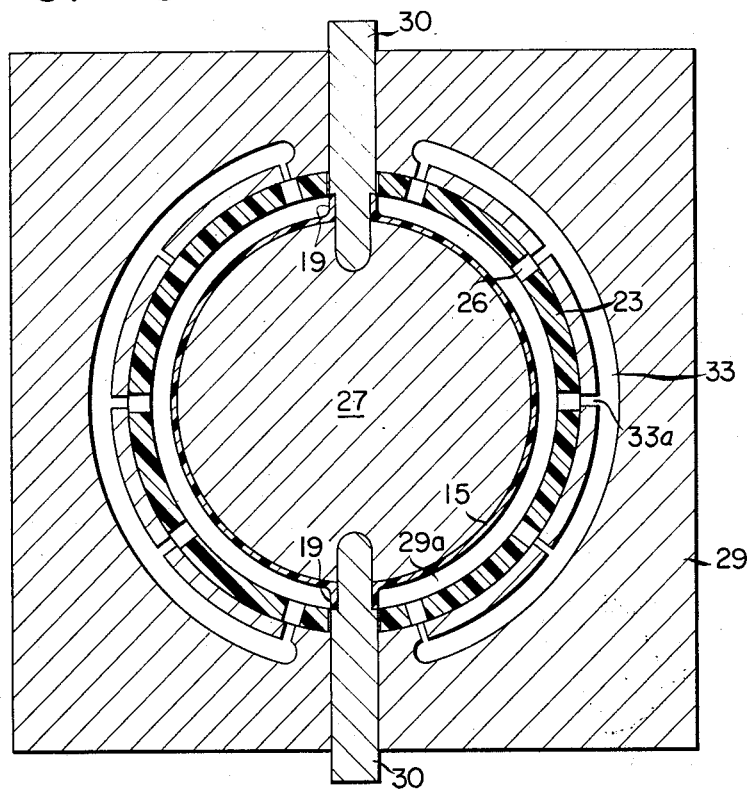
FIG. 6 is a lateral sectional view of the state shown in FIG. 5.
Figure 7:
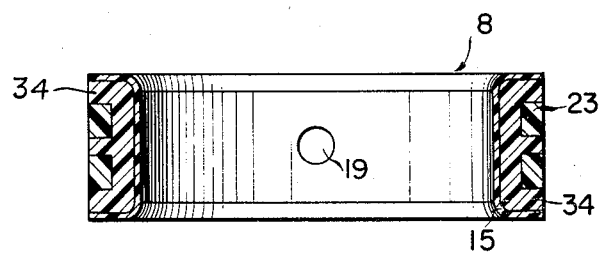
FIG. 7 is a sectional view of the seat ring obtained by the present invention.

On the other hand, in addition to the inner layer 15, an annular body 23a shown in FIG. 3 is formed from the material such as thermosetting synthetic resins such as, for example, phenol resin, epoxy resin, fiber reinforced polyester resin and diallylphthalate resin, thermoplastic synthetic resins having high thermal deformation temperature such as, for example, polyacetal, nylon and polyethylene terephthalate. Two stem-inserting holes 24 and 25 of the top and bottom stems 2 and 3 are opened at two positions opposite to each other at the peripheral surface of the annular body 23a, and a plurality of small injecting holes 26 are formed at intervals at the general center portion of the annular body 23a in lateral direction on the peripheral surface of the stem-inserting holes 24 and 25 so as to form the outer layer 23 for the innder layer 15. Then, the outer layers 23 and 15 are so disposed that the outer layer 23 is loosely engaged with the barrel of the inner layer 15 and that the respective stem-inserting holes 19, 19 and 24, 25 of the inner and outer layers 15 and 23, respectively are disposed on one straight line with respect to each other. Then, as shown in FIG. 4, which shows the step of engaging a fixing core between the inner and outer layers of the seat ring, a pair of cores 27 divided into two at the intermediate portion are inserted from both the upper and lower openings of the inner layer 15, and cutouts 27b formed on the butt surface 27a of the core 27 are coincided with the respective stem-inserting holes 19, 19 and 24, 25 of the inner and outer layers 15 and 23. Then, as shown in FIG. 5, which shows the state that the inner and outer layers and fixing core are inserted into the metal mold, these are contained in the cavities 28a and 29a of the upper and lower metal molds 28 and 29, respectively preheated, and the end of the fixing core 30 provided between the upper and lower metal molds 28 and 29 is forwarded to the cutouts 27b of the core 27 through the respective stem-inserting holes 18, 19 and 24, 25 of the inner and outer layers 15 and 23 so as to positively fix the inner and outer layers 15 and 23 to a predetermined position of the upper and lower metal molds 28 and 29. Here, the outer layer 23 contacted with the inner peripheral surfaces of the cavities 28 and 29 contained in the upper and lower metal molds 28 and 29 receives the preheat of the metal molds 28 and 29 to thermally expand so that the outer peripheral surface thereof is tightly cntacted with the inner surfaces of the cavities 28a and 29a. The relationship of the inner diameters of the cavities 28a and 29a and the outer diameters of the outer layer 23 is such that the outer diameter of the outer layer 23 is a $\pm \frac{\alpha}{\beta}$ with respect to the inner diameter a of the cavities 28a and 29a.

Wherein:

$\alpha$ represents $KM \cdot a(T2 - T1) - d$ $\beta$ represents $a \cdot (KR - KM) \cdot (T2 - T1) - e$ And, KM represents the coefficient of linear expansion of the meterial of the metal mold, KR represents the coefficient of linear expansion of the outer layer, T1 represents a room temperature, while T2 represents a preheat temperature of metal molds, d represents a minimum gap possible to insert between the outer layer and the cavity, e represents the interference from the outer layer to the metal mold so that the intermediate layer may not be leaked.

The actual values of the above factors will now be described, using, for example, iron metal molds having cavities 28a and 29a of 340mm of its inner diameter, when the outer layers formed by floc and mineral filler mixed phenol resin was preheated to approximately 150°C, the values of the factors d and e in the above formula became 0.1mm, and accordingly the size of the outer diameter became $$340 \begin{array}{c} +0.4 \text{ mm.} \\ -0.7 \text{ mm.} \end{array}$$

in consideration with some safety factor. When the metal molds were preheated without inserting the outer layer 23, the inner diameters of the cavities 28a and 29a became 340.5mm. Thus, the outer layer 23a of 340.0mm of maximum diameter before preheating may be inserted, and when the outer layer 23 contained in the metal molds 28 and 29 was preheated, the outer layer 23 expanded to 340.6mm to a minimum rate, and accordingly the outer peripheral surface of the outer layer 23 may be positively contacted tightly with the inner surfaces of the cavities 28a and 29a.

As shown in FIG. 5, the inner and outer layers 15 and 23 are fixed to predetermined positions of the molds 28 and 29 at predetermined intervals, the ram 30 of a mold-tightening machine is so operated as to urge under pressure the upper and lower metal molds 28 and 29 between the upper and lower die plates 31 to tighten the molds 28 and 29, and the pressure is then applied by a piston 32 to the molten resilient material such as rubber, etc. injected into the cylinder 31a of the upper die plate 31 so as to introduce the molten resilient material from a runner 33 formed in the metal molds 28 and 29 into a gate 33a disposed around the outer layer 23 to inject it through the injecting holes 26 of the outer layer 23 communicated with the gate 34 between the outer and inner layers 23 and 15. Since the injected resilient material is tightly contacted in advance with the inner surfaces of the cavities 28a and 29a by the injection pressure and the heat expansions, it is not apprehended at all that the injected resilient material is leaked from the gaps of these components. And, since the resilient material is simultaneously injected through the injecting holes 26 opened on the peripheral surface of the outer layer 23, the pressure distribution of the resilient material in the cavities 28a and 29a is uniformed so as to obtain uniform intermediate layer 34. After the resilient material is injected, the metal molds 28 and 29, the metal molds 28 and 29 are cooled by cooling means (not shown) so as to cool to solidify the resilient material injected between the inner and outer layers 15 and 23 to form the intermediate layer 34 for integrating the inner and outer layers 15 and 23. Then, when the intermediate layer 34 is sufficiently solidified, the upper and lower die plates 31 of the mold-tightening machine are separated so as to separate the upper and lower molds 28 and 29 elevationally to upside and downside, and the seat ring 8 formed with the three layers is then removed from the cavities 28a and 29a, and the liners, etc. adhered around the outer layer 23 are also removed in order to complete the seat ring 8. The seat ring 8 thus obtained has the inner layer 15 made of wear resisting and anticorrosive material, the intermediate layer 34 for resiliently supporting the inner layer 15 to provide good sealing in contact with the disc, and the outer layer 23 for enhancing the strength of the inner and intermediate layers 15 and 34 to become endurable for high pressure, and high accuracy of the seat ring 8 itself to be engaged accurately and tightly with the valve body 1 upon mounting thereof.

It should be understood from the foregoing description that since the seat ring made of three layers such as inner, intermediate and outer layers, is superior in anticorrosive property for chemical fluid when corrosive drugs are treated and has good sealing with the disc, and is further reinforced in strength of overall the seat ring by the outer layer, it may endure for high pressure. It should also be understood that since the seat ring is integrally made of these three layers, its productivity is remarkably improved in comparison with the conventional adhering means so as to lessen the irregularity of the products and to reduce its cost.

Though in the above embodiment the resilient material for forming the intermediate layer is merely rubber, valcanized natural rubber, vulcanized synthetic rubber, or cross-linked copolymer of polyurethane, ethylene-vinyl acetate, ethylene-vinyl chloride, ethylene-propylene may be used within the scope of the present invention.

Other variations of the foregoing embodiments of the invention will be apparent to those skilled in the art.

What is claimed is:

1. A method of producing the seat ring of a butterfly valve comprising the steps of inserting concentrically an inner layer formed in cylindrical shape in advance with wear resisting and anticorrosive material and an outer layer formed in annular shape in advance as a strong member with thermosetting resin or thermoplastic resin having high thermal deformation temperature into the cavities of preheated metal molds through a predetermined space to thermally expand said outer layer to closely contact the outer layer with the inner surface of the cavities of the molds, injecting simultaneously molten resilient material through a plurality of injecting holes opened at intervals on the periphery of said outer layer from the exterior of said outer layer between said inner and outer layers, and then cooling to solidify the injected resilient material to form an intermediate layer for integrating said inner and outer layers.

2. A method as set forth in claim 1, further comprising the steps of forming a stem-inserting hole on the peripheral opposite surface of said inner layer with heated jig in plastic deformation, and projecting collar edges at both ends of said inner layer in plastic deformation by the heated metal molds.

3. A method as set forth in claim 1, further comprising the steps of inserting a fixing core into the stem-inserting holes of preformed inner and outer layers from the exterior of said outer layer to fix said inner and outer layers in the cavities of the metal molds at predetermined intervals, and removing the fixing core therefrom after the intermediate layer is injected between said inner and outer layers to form a stem-inserting hole.

4. A butterfly valve seat ring structure comprised of an annular valve body having top and bottom fitting ports located at the top and bottom thereof, with top and bottom stems inserted respectively in said ports, a seat ring engaged with the inner peripheral surface of the valve body and a disc rotatably located in the seat ring, and further comprising a cylindrical inner layer of wear resisting and anticorrosive material, an annular outer layer of thermosetting resin or thermoplastic resin having high thermal deformation temperature concentrically spaced from said inner layer, and an intermediate layer of resilient material integrated between said inner and outer layers.

5. A butterfly valve seat ring structure comprised of an annular valve body having top and bottom fitting ports located at the top and bottom thereof, with top and bottom stems inserted respectively in said ports, a projection portion extending from said top stem, a seat ring engaged with the inner peripheral surface of the valve body and a disc rotatably located in the seat ring and further comprising a cylindrical inner layer of wear resisting and anticorrosive material, an annular outer layer of thermosetting resin or thermoplastic resin having high thermal deformation temperature concentrically spaced from said inner layer, and an intermediate layer of resilient material integrated between said inner and outer layers.

6. A butterfly valve seat ring structure comprised of an annular valve body having top and bottom fitting ports located at the top and bottom thereof, with top and bottom stems inserted respectively in said ports, a projection portion extending from said top stem and a handle means mounted on said projection portion, a seat ring engaged with the inner peripheral surface of the valve body and a disc rotatably located in the seat ring and further comprising a cylindrical inner layer of wear resisting and anticorrosive material, an annular outer layer of thermosetting resin or thermoplastic resin having high thermal deformation temperature concentrically spaced from said inner layer, and an intermediate layer of resilient material integrated between said inner and outer layers.

* * * * *